United States Patent [19]
Goldsworthy et al.

[11] 3,957,410
[45] May 18, 1976

[54] MEANS FOR CENTRIFUGALLY CASTING A PLASTIC TUBULAR MEMBER

[75] Inventors: William B. Goldsworthy, Palos Verdes Estates; Ethridge E. Hardesty, Pine Valley, both of Calif.

[73] Assignee: Goldsworthy Engineering, Inc., Torrance, Calif.

[22] Filed: Apr. 14, 1972

[21] Appl. No.: 244,189

[52] U.S. Cl. .............................. 425/183; 425/434; 425/435; 425/453
[51] Int. Cl.² .................... B29C 5/04; B29D 23/08
[58] Field of Search .......... 164/286, 298, 295, 300, 164/301, 299; 425/425–427, 429, 435, 183, 434, 453

[56] References Cited
UNITED STATES PATENTS

| | | | |
|---|---|---|---|
| 2,859,151 | 11/1958 | Usab et al. | 425/435 |
| 2,994,919 | 8/1961 | Schafer et al. | 425/435 |
| 3,381,744 | 5/1968 | Tallone | 164/295 |
| 3,506,752 | 4/1970 | Varnell et al. | 264/311 |
| 3,561,059 | 2/1971 | Guldenfels | 425/435 |
| 3,679,337 | 7/1972 | Fuselier | 425/435 |

FOREIGN PATENTS OR APPLICATIONS
531,346    10/1956    Canada ............................... 164/295

Primary Examiner—Francis S. Husar
Assistant Examiner—John McQuade
Attorney, Agent, or Firm—Romney Schaap Golant Scillieri & Ashen

[57] ABSTRACT

Reinforced plastic pipe and similar tubular members are formed by centrifugally casting filamentary strand materials, such as glass roving, in a rotating cylindrical mold. A solvent dispersed mold release agent may be sprayed into the mold prior to the application of the filament. Thereafter, a spray of catalyzed binder resin is added to the filamentary material. A lance is extended into the mold and contains feeding tubes for depositing the filamentary strand, as well as nozzles for depositing the resin on the surface of the mold. Also, the lance contains extra nozzles for the addition of particulate matter such as sand to achieve desired structural quality and economic fabrication of the tubular member. The amount of the components added and the timing of the component addition is determined by the desired end product to be achieved.

22 Claims, 13 Drawing Figures

MEANS FOR CENTRIFUGALLY CASTING A PLASTIC TUBULAR MEMBER

BACKGROUND OF THE INVENTION

This invention relates in general to certain new and useful improvements in an apparatus for making filament reinforced tubular members, and more particularly, to an improved apparatus of making centrifugally cast filament reinforced tubular members which are capable of withstanding both internal and external pressure loads, and which also include particulate matter as an integral part of the component structure.

In recent years, reinforced plastic composite materials have received widespread attention due to the advances available in fabricating such structures and due to the increased availability of raw materials. Furthermore, reinforced plastic pipe has achieved increasing prominence in many industries since the reinforced plastic composite exhibits many structural abilities which are not inherent in their metal counterparts.

Reinforced plastic pipes are commonly formed by generating a cylinder from a suitable filamentary material through continuously winding filaments on a removable mandrel. The filament strands are impregnated with curable resin material, either before application of the strands to the mandrel or upon application of the strands to the mandrel, followed by a curing of the structure and removal from the mandrel. Such a system is exemplified by U.S. Pat. No. 3,128,216. Another technique commonly used in the fabrication of reinforced plastic pipe is to generate a cylinder from a suitable filamentary material by continuously winding the filaments on a fixed mandrel, impregnating the filaments, curing the composite structure, and continually removing the formed structure from the mandrel. By appropriate selection of the filamentary material and the binder, strong corrosion resistant structures can be fabricated.

Due to the high strength of fiberglass filaments and similar types of filamentary materials, such structures are capable of withstanding substantial internal pressure loads. In many applications, particularly for large diameter pipe, such as in underground pipe lines, the wall thickness is dictated by the external pressures and nonuniform loading produced by the ground loading rather than the internal pressures. Thus, the pipe structure is required to have a wall thickness which is substantially heavier than would be necessary to withstand internal pressures normally encountered. Inasmuch as the cost of raw materials needed for reinforced plastic pipe capable of withstanding a given external pressure load is substantially greater than the cost of counterpart materials, such as reinforced concrete or steel, the latter materials are generally used in pipe manufacture where the pipe is to withstand heavy external pressure loading, even though reinforced plastic pipe has generally superior physical and chemical properties.

In order to obviate this problem, there have been certain attempts to incorporate small inert particulate matter such as sand, similar spherical particles, and the like in the reinforced plastic composite. In addition, it has been proposed to form large diameter reinforced plastic pipe in the form of laminated structures. Such a structure consists of a thin layer of glass filaments and a layer of resin matrix as a first layer surrounded by a thick mass of core material of inert matter capable of withstanding compressive loading. When the cylindrical structure is subject to external loads, however, the deformation of the cross section is resisted by sheer loads at the interfaces between the core material and the reinforced plastic and failure of the structure occurs at the bond between these materials.

It is, therefore, the primary object of the present invention to provide a method and apparatus for the production of filament reinforced tubular members capable of withstanding both internal and external pressure loadings.

It is another object of the present invention to provide a method and apparatus of the type stated for manufacturing filament reinforced tubular members by centrifugally casting the filamentary material and adding a resinparticulate matter composition to the filamentary material to thereby form a composite.

It is an additional object of the present invention to provide an apparatus for producing filament reinforced tubular members on a mass-production basis which eliminates the necessity of employing conventional filament winding techniques and manually directed spray-up.

It is also an object of the present invention to provide an apparatus and method of the type stated which is readily adaptable to produce tubular members of a wide variety of sizes and cross sectional shapes.

It is a further object of the present invention to provide filament reinforced tubular members which inherently includes all of the necessary physical capabilities and mechanical attributes normally found in conventional filament wound tubular structure, but which eliminates the undesirable conventional filament winding techniques.

With the above and other objects in view, our invention resides in the novel features of form, construction, arrangement, and combination of parts presently described and pointed out in the claims.

In the accompanying drawings:

FIGS. 8–13 are a series of sequential schematic sectional views showing the application and in strands to a mold to form the side wall shell of the tubular member, of which:

GENERAL DESCRIPTION

The tubular members of the present invention may be formed with a wide variety of cross sectional shapes so that the tubular members may be used as conduit for conveying fluids or other media, or which tubular member may be used as structural elements. The tubular members of the present invention are formed by centrifugally casting filament reinforcement such as fiber glass filament strands in a rotating cylindrical mold along with a binder resin or so-called "resin-matrix" to form a reinforced plastic composite. The interior surface of the mold is highly polished for receiving the filament reinforcing material and the mold is also rotated about its major axis during the application of the roving strands. The cylindrical support and rotating drive is accomplished by a drive mechanism hereinafter described.

A lance arrangement comprising several tubes is inserted into the interior of the mold along its major axis. The lance carries a plurality of axially spaced radially directed tubes for transporting the roving strands. Additional tubes are carried by the lance to deliver a liquid-binder resin. It is also possible to have the lance carry a high intensity light for allowing an operator to view the process and monitor the operations.

A solvent dispersed mold release agent is sprayed by the leading tube onto the inner metal surface of the mold as the lance is being inserted into the cylindrical metal mold. Following this, an exterior gel coat is applied and allowed to stiffen. The gel coating which is employed should be pigmented with an inert colloid. After the application of a mold release agent and the binder resin, the speed of rotation of the cylindrical mold is increased.

The filament strands are centrifugally cast against the interior surface of the cylindrical mold by shifting the lance during the rotation of the mold. The lance is shifted for a distance so that the strands are applied to the surface of the mold in a side-by-side relationship. Inasmuch as a number of filament nozzles are employed, the strand deposition coverage is obtained by reciprocating the lance back and forth horizontally. Furthermore, this filament strand application is continued until an initial high density layer is obtained on the interior surface of the mold. Thereafter, the speed of rotation of the mold may be reduced or the strand feed rate may be increased so that the strands are caused by lay down in the form of overlapping continuous flat spirals. During this time, resin may be applied to the strands either during the actual application of the strands or after the strands have been applied to the surface of the mold. Thereafter, the rotational velocity of the mold is again increased to its original velocity in order to again apply complete and continuous layers of circumferential windings or so-called "circumferentials" over the entire interior mold surface. Simultaneously with the laying of the continuous filaments, the spray of liquid catalyzed binder resin has also been applied.

It should also be observed that particulate matter such as sand, glass beads, or the like may also be applied to the interior surface of the mold in order to build up certain desired structural qualities in the final tubular product. The particulate matter may be added either simultaneously with the addition of the resin, or in timed relation to the addition of the resin and/or the glass strands.

After all of the components have been added, the speed of rotation of the mold is increased and additional liquid resin is generally applied in the form of the very thin resin float on the inner surface. The inherent centripedal force from the rotation of the mold aids in compacting the glass-resin composite. Furthermore, the particulate matter displaces the resin and moves toward the exterior surface of the tubular composite being formed. As this occurs, the resin will be urged inwardly to form a resinrich inner layer. After allowing sufficient time for the resin to cure, the mold is stopped and the tubular product is removed.

Generally, the mold is rotated at a speed which is programmed to the filament deposition rate. In one embodiment of the invention, it is possible to rotate the mold and employ a series of feeding heads which extend toward the interior surface of the mold, thereby applying a continuous layer of filament to the mold surface as it rotates. As another embodiment, it is possible to reciprocate the filament feeding tubes for a distance equal to the radius of the mold as the mold rotates. Furthermore, it is also possible to rotate the filament feeding tubes about the mold in circles of increasing radii in order to lay continuous filament strands on the entire surface of the mold. The mold is preferably heated in order to obtain faster solidification of the binder-resin and shorter cure time in the completed lay-up.

Also, the far end of the pipe or other tubular member thus formed may be provided with a bell-shaped portion as is conventional in the production of concrete and steel pipe. Of course, the bell-shaped portion of the pipe is the first portion to be removed from the mold. Likewise, the forward end of the pipe may be provided with a plug which is adaptable to mate with the bell-shaped portion of another pipe.

METHOD

A number of method sequences or stages are performed during the formation of the pipe or other tubular member.

A lance which feeds both the filament from a remote pallet and which lance contains resin applicators is inserted through the end of the cylindrical mold.

After the lance arrangement which carries the filament and resin matrix has been inserted into the mold, the resin applicators are actuated to lay a thin resin layer on the surface of the mold while the mold is rotating. Furthermore, the mold is rotating at a relatively slow speed which is only sufficient to cause the centrifugal force to hold the resin against the side wall. Thereafter, the filament feeding nozzles which are mounted on the lance are advanced to a point where they are close to the interior of the mold.

After the filament feeding nozzles have been advanced to a point close to the interior surface of the mold, a layer of filament strands is centrifugally applied to the interior surface at a rae identical to the peripheral speed of the surface through the rotation of the mold. At this point, the lance is advanced causing the filament strands to lay in a side-by-side pattern. It should be recognized that an individual feeding nozzle is provided for each predetermined segment or distance. In order to provide a fiber thickness of several layers, the lance may be shifted so that the feed nozzles are shifted several times between the limits of the segment of application.

After a layer of the filament strands have been applied in a side-by-side pattern, much in the same manner as employed in conventional filament winding techniques, the rate of filament feeding to the feeding nozzles is changed Metering rollers are provided for regulation of feed rate and are programmed to account for the change in peripheral speed of the deposition surface. As the filament strands are applied to the interior wall, the build-up will reduce the overall radius of filament application and accordingly, the peripheral speed thereof will change. Inasmush as the filament strands must be applied at the same rate as the peripheral speed of the deposition surface moving past the filament nozzles, the metering rollers are designed to account for this change in peripheral speed.

The speed of rotation of the mold and the speed of reciprocation of the lance is held constant and the glass feed rate is materially increased by an order of magnitude to cause the filament strands to lay in a swirl or spiral pattern. Simultaneously with the laying of the enlarged quantity of filament strands in these patterns, a resin spray from the resin feeding heads is applied and the rate of application is commensurate with the amount of glass deposited in the mold. It should be recognized that as an alternative, the glass feed rate could be maintained constant and the speed of rotation of the mold could be reduced in order to increase the amount of glass laid in the mold per unit of time. This build-up of swirl pattern filaments is continued until the desired wall thickness is attained. Thereafter, the resin application is ceased and the speed of rotation of the mold is increased. By placing a maximum centrifugal force on the deposited materials, it is possible to densify the materials and "float out" the entrained air. In addition, this type of action will cause the resin to move to the inner surface since the resin has a lower density than the reinforcing material. This will also cause a resin-rich inner layer which, in turn, forms a rather unique seal which can be further enhanced by the addition of small thin glass flakes. The mold is continually rotated at this speed and the lance is removed.

As an alternative, particulate matter such as sand, may be added during the formation of the pipe side wall. The amount of sand typically would range from approximately 10% by weight of the total composition. The sand is added either simultaneously with the application of the resin or at intermittent time intervals with respect to the resin. Separate nozzles are provided on the lance for adding the sand. In addition, the sand would be metered in order to provide the proper amount.

A longitudinally shiftable heater may be located on the opposite side of the cylindrical mold with respect to the lance structure. After removal of the lance, the heater can be inserted through the opposite end of the mold cusing the resin impregnated reinforced fiber glass to cure.

By the unique methods described herein, it can be seen that it is possible to produce a relatively large diameter pipe for liquid or solid transportation by centrifugal casting of continuous filament strands. Furthermore, it is possible to build a relatively thick side wall in a relatively short period of time and to produce a resin-rich inner surface on the interior surface of the pipe. In addition, the glass is transported by an air vehicle in the lance and this type of arrangement materially reduces the normal abrasion problem encountered in the transporting of fiber glass. The pipe produced by the method and the apparatus of the present invention is unique in that it is capable of withstanding high compression loads.

In order to accomplish the method of the present invention, a preferred embodiment of the apparatus for producing the tubular members described herein is more fully illustrated and described. It should be recognized that there are a number of components which can be substituted for the components herein described in this particular embodiment of the apparatus. For example, pneumatic drive systems could be conveniently substituted for the particular mechanical drive systems illustrated and described herein. Nevertheless, the particular embodiments of the apparatus herein described and illustrated have been found to be the preferred embodiments.

DETAILED DESCRIPTION

Referring now in more detail and by reference characters to the drawings which illustrate a preferred embodiment of the present invention, A designates an apparatus for producing filament reinforced tubular members T. The apparatus of the present invention has been described in connection with the production of a tubular member T which is circular in cross sectional shape and which serves as a fluid conduit, for example. However, it should be observed that both the apparatus and the method of the present invention is capable of producing tubular members of a wide variety cross sectional shapes. For example, it is possible to produce tubular members having a somewhat rectangular or other type of noncircular cross section so that the tubular member can be used as a structural component or the like.

Figure 1:
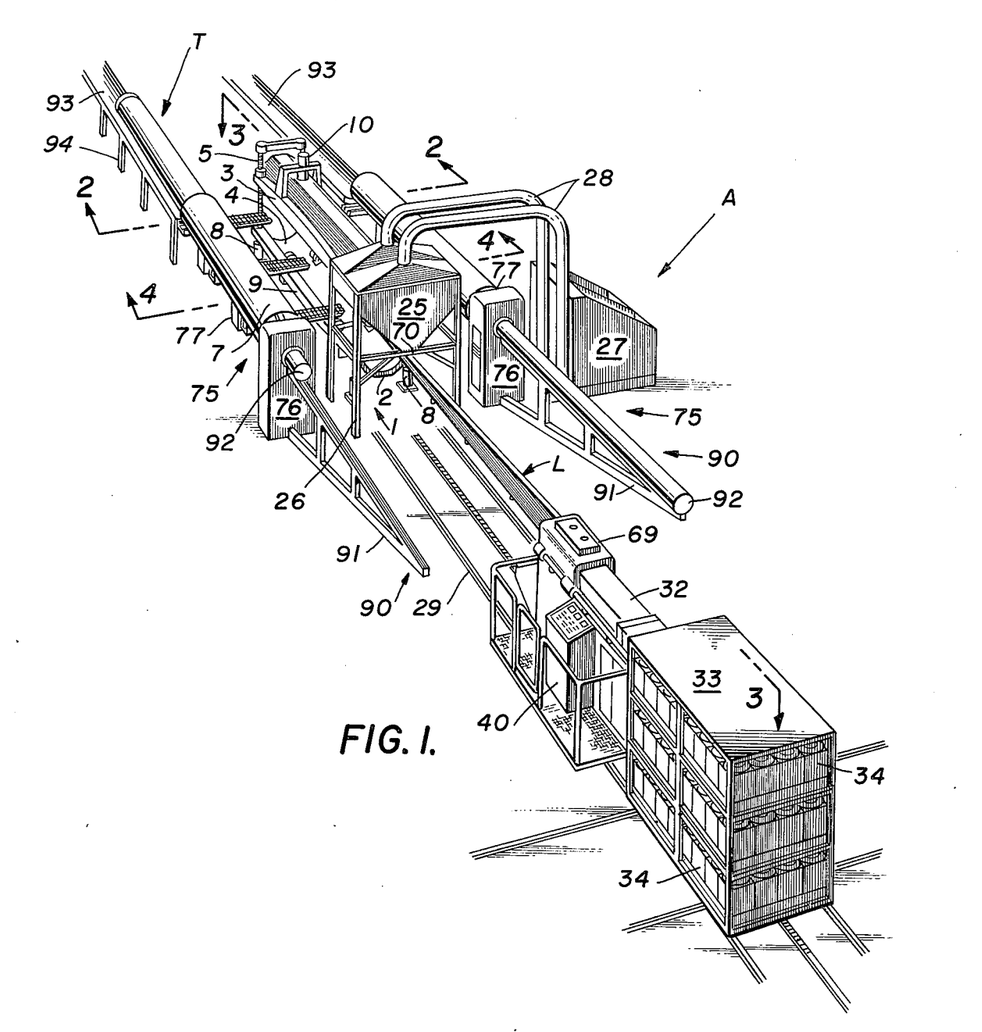
FIG. 1 is a perspective view showing the apparatus for forming filament wound tubular structures in accordance with the present invention.
Figure 2:
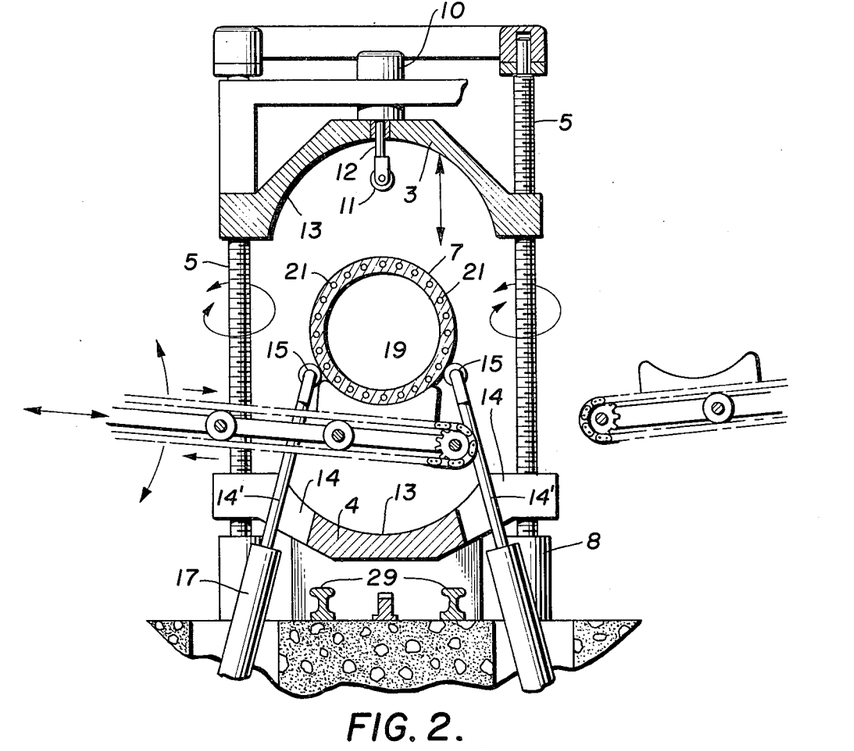
FIG. 2 is a side elevation in partial section of the apparatus taken along lines 2—2 of FIG. 1.

The apparatus in FIG. 1 generally comprises a mold supporting structure 1 which comprises a base frame 2 having oppositely disposed upper and lower mold support frames 3, 4. It can be seen that the support structure 1 is also provided with a pair of upstanding vertically disposed support rods 5 at each transverse end. The upper mold support frame 3 is shiftable in a vertical direction with regard to the lower mold support frame 4 in the manner as illustrated in FIG. 2. Furthermore, it should be observed that the mold support frames 3, 4 have an interior surface which is sized to accommodate a suitable mold 7 in the manner as illustrated in FIGS. 1 and 2.

The support rods 5 are actually in the form of jack screws and are provided at their upper and lower ends with gear boxes 8. Furthermore, each of the transversely located support rods 5 are connected through cross bars 9 extending between each of the gear boxes 8 in order to raise the upper and lower mold support frame 3 with the proper amount of force on both sides of the frame. Also carried by the upper mold support frame 3 is an electric motor 10 which powers a drive roller 11 by means of a drive shaft 12 which extends through mold support frame 3 for engaging the mold 7 in the manner as illustrated in FIG. 2. The roller 11 may be operable by the to motor 10 or any other suitable conventional drive mechanism (not shown) and which is located on the mold support frame 3.

Each of the upper and lower mold support frames 3, 4 has arcuately shaped interiorly presented side walls 13 which form an overall annular surface with a diametral size larger than the mold 7 to thereby accommodate the mold 7. Projecting through apertures 14 formed in the lower mold support frame 3 are a pair of extended support shafts 14' and each of which carry drive rollers 15 which are in turn, connected to suitable motors (not shown), equivalent to the motor 10 by means of a conventional mechanical drive 17. Thus, when the mold 7 is introduced into the cavity formed between the mold support frames 3, 4 and the mold support frames 3, 4 are shifted vertically so that opposed longitudinal margins are urged into contact with each other, the mold 7 will tightly engage the drive rollers 11 and 15.

It should also be observed that the motors 10, and the motor which operates the mechanical drive 17 are controlled from a common source by means of a conventional motor control circuit (not shown) so that the drive rollers 11 and 15 both operate at the same peripheral speed.

The mold 7 is preferably formed of steel or similar structural material and is generally provided with a smooth, highly polished, interior surface 19 and having open transverse ends. The mold 7 may also be provided with internally located heating elements 21 conventionally connected to a source of power in order to heat the mold during rotation about its major axis. A heating blanket (not shown) may also be disposed around the exterior surface of the mold 7. The heating of the mold 7 will provide a faster "flash-off" of the solvents in the mold release agent and provide reduced viscosity in the gel coat and binder resin. In addition, the application of heat will substantially reduce cure time.

Located at the right-hand end of the supporting structure 1, in the manner as illustrated in FIG. 1, is a hopper 25 containing sand or other particulate matter. The hopper 25 is suitably supported on a rectangular box-like support frame 26. Furthermore, sand is introduced into the hopper 25 from a supply tank 27 through supply tubes 28. The tank 27 would normally include a pump or similar delivery mechanism for conveying the sand or other particulate matter in the tank 27 to the hopper 25.

Figure 3:
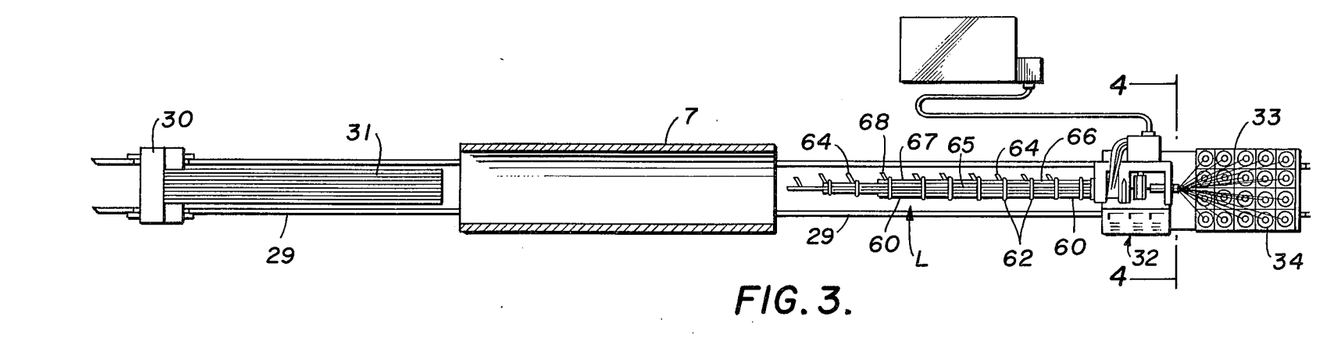
FIG. 3 is a top plan view in partial section of the apparatus taken along lines 3—3 of FIG. 1.

By further reference to FIGS. 2 and 3, it can be seen that the supporting structure 1 is located in alignment with a pair of tracks 29. Suitably mounted on the left-hand end of the track 29 with respect to the mold 7 is a heater carriage 30 which carries an insertion heater 31. Thus, upon proper command from a control console (hereinafter described) the heater carriage shifts toward the mold 7 and the insertion heater 31 is shifted inwardly into the mold 7 along its major axis for curing the reinforced plastic composite formed in the mold 7.

Also shiftable along the track 29 and being located on the right-hand end of the mold 7, reference being made to FIGS. 1-3, is a shiftable lance supporting carriage 32 supporting a forwardly extending lance L, and connected to the carriage 32 and being movable therewith is a creel supporting platform 33. The platform 33 carries a series of roving spools 34 for feeding individual roving strands to the carriage 32.

Figure 5:
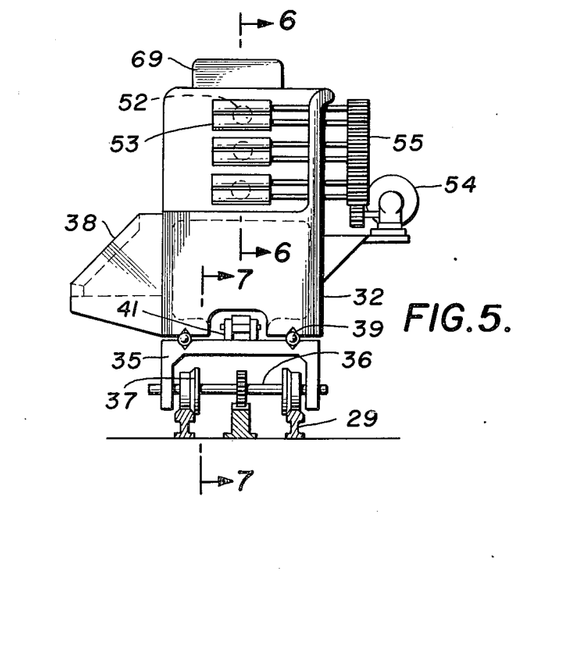
FIG. 5 is an end elevational view showing a carriage mechanism for introducing a lance into a die and taken substantially along line 4—4 of FIG. 3.
Figure 6:
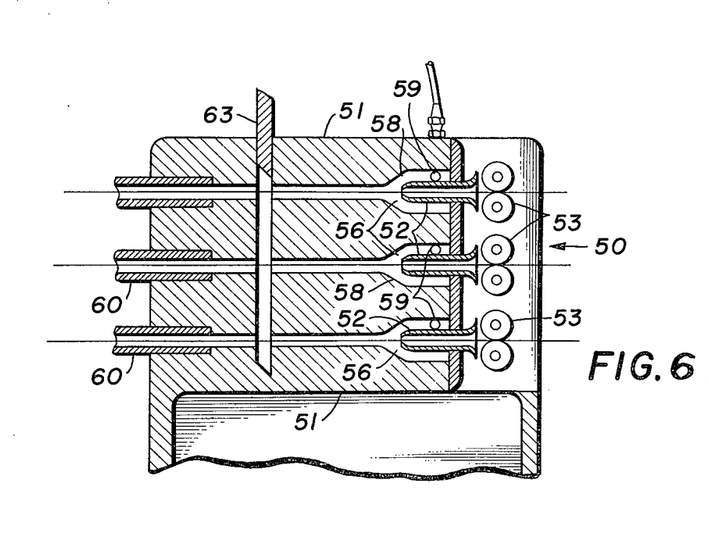
FIG. 6 is a fragmentary vertical sectional view taken along line 6—6 of FIG. 5.
Figures 7, 8, 9, 10, 11:
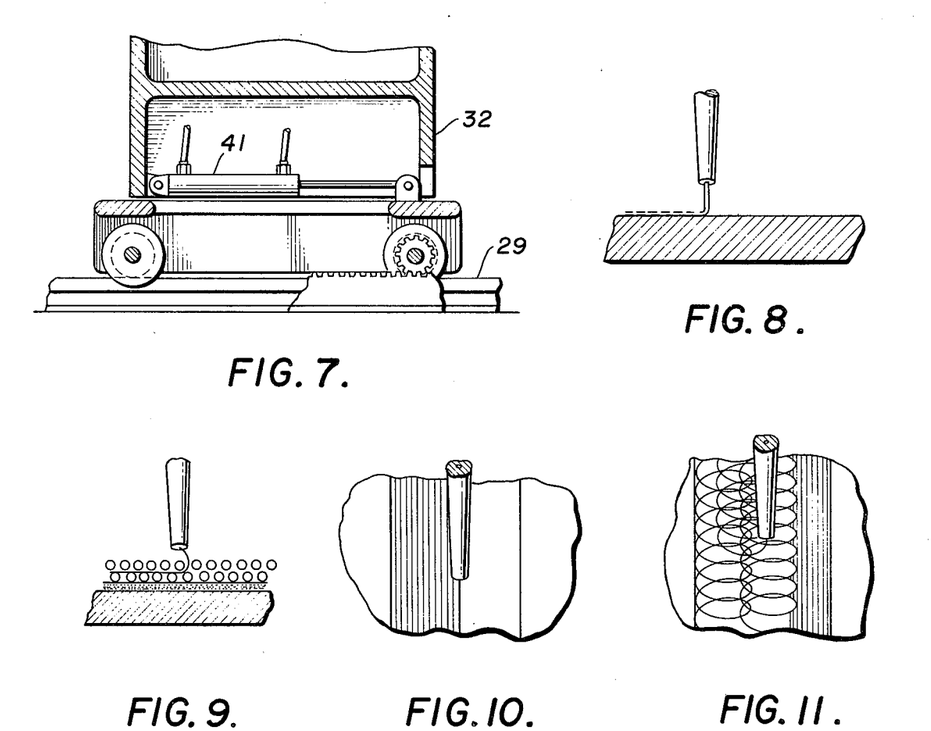
FIG. 7 is a fragmentary vertical sectional view taken along line 7—7 of FIG. 6.
FIG. 8 is a schematic side elevational view showing the application of an initial gel coat to the interior surface of the mold.
FIG. 9 is a schematic side elevational view showing the initial laying of circumferential filament strands in the mold of the present invention.
FIG. 10 is a schematic top plan view showing the laying of circumferential filament strands in the mold of the present invention.
FIG. 11 is a schematic top plan view showing the application of the second layer of strands in the form of spirals in the fabrication of the side wall shell of the tubular member.

A portion of the carriage 32 which continues the movement of the lance L and the feeding of the various materials to the mold 7 is more fully illustrated in FIGS. 5, 6 and 7. This portion of the carriage 32 generally comprises a U-shaped base frame 35. Extending between the flanges forming the U-shaped base frame 35 are a pair of axles 36 which carry rollers 37 for supporting the carriage 33 on the tracks 29. Shiftably disposed on the base frame 35 is an upper carriage frame 38 which is shiftable on the base frame 35 by means of pairs of roller bearings 39. By reference to FIG. 1 it can be seen that a portion of the carriage 32 carries a control panel 40 for controlling the various operations of the components forming part of the apparatus A. The control panel 40 is suitably connected to a control mechanism and a control programmer (neither illustrated nor described in detail herein, inasmuch as this structure is conventional). The upper carriage frame 38 is powered in its shifting movement with respect to the base frame 35 by means of a hydraulic cylinder 41, the latter being actuated by the aforesaid control mechanism.

The upper carriage frame 38 carries a lance supporting housing (FIG. 5) and which is provided with an air operated filament feeding system 50 (FIG. 6). The filament feeding system 50 is also more fully illustrated and described in copending application Ser. No. 112,162, filed Feb. 3, 1971, now U.S. Pat. No. 3,713,572, dated Jan. 30, 1973. The feeding mechanism 50 comprises a manifold 51 having a series of filament guides 52. Each filament guide 52 is designed to receive the individual roving strands from the creel supporting platform 33 and each guide 52 is associated with a pair of metering rollers 53. The rollers 53 are rotatably supported on the carriage frame 38 and are driven by a conventional alternating electrical motor 54 through a gear train 55. Each filament guide is disposed within an air chamber 56 and is provided with an open discharge 57 in an area proximate a venturi throat 58 formed in the air chamber 56. Each of the chambers 56 receives air under pressure through air lines 59, in the manner as illustrated in FIG. 6.

The filament which is moved into the filament guides 52 through the metering rollers 53 is sucked into the venturi throat by means of the air under pressure introduced into the chambers 56. Each venturi throat 58 is connected to a filament feeding tube 60 located in the lance L. The lance L comprises a cylindrical mounting hub 62 which carries the series of filament feeding tubes 60. A conventional guillotine type cutter 63 is located in the manifold 51 and extends through each of the tubes 60 in order to sever strands at desired time intervals. It can be seen that the filament strands are essentially drawn into the tubes 60 by means of the high pressure area in the venturi throat 58. The proper tension is maintained on the strands by means of the metering rollers 53. After a complete winding operation has been performed, the various strands in the tubes 60 can be severed by means of the conventional cutter 63.

The feeding tubes 60 terminate in feeding heads 64 at various distances along the length of the lance L. The lance L also carries a resin supply tube 65 which is provided along its length with radially extending resin feeder pipes 66. Generally, a resin feeder pipe 66 is provided for each filament feeding head 64. The resin feeder pipe 66 may be located along side of the feeding head 64 or it may be located in an angular position. The glass and the resin are generally laid or deposited simultaneously. However, the glass and resin may be deposited in sequential operations. When sequential operations are employed the resin is generally sprayed first and then followed by the application of glass; though the glass could first be applied and followed by a spray of resin.

Any continuous material or synthetic filament capable of being bent to conform to a desired shape can be employed in the present invention. The most preferred filament employed in the present invention is that made of glass. However, it should be recognized that boron filaments, graphite tows, filaments from lithium and other grown-whisker crystals can be employed. In addition, metal wire may be interspersed with the glass filaments in the event that it is desired to add some type of metallic body to the fiber glass reinforced structure which is produced, such as for electrical conductivity. Furthermore, quartz filaments may also be employed.

Any material which is normally liquefied or which is capable at some stage of the process of being liquefied and softened for a period of time may be employed as the resin binder or so-called "matrix." The matrix should be sufficient to flow around the filaments and fill the interstices between adjacent filaments and layers thereof before achieving a rigid state or completing polymerization to become a rigid solid. Furthermore, the matrix should posses the ability to adhere to the reinforcement. Some examples of the suitable binders or matrix which can be employed in the present invention are various thermoplastic resins, such as nylon, polyethylene, polypropylene, many of the polycarbonates, etc. In addition, thermosetting resins such as polyesters, many of the phenolics and epoxys, etc., can be used. Generally, the thermosetting resins should be capable of being fused into an insoluble, non-heat softening mass upon application of hear or similar method of triggering the catalytic system. Other binders or matrices are hard waxes, eutectic ceramics, eutectic metals, synthetic rubbers, etc.

The particulate matter is introduced into the resin glass composition by means of a separate feeding tube 67 terminating in a nozzle 68 on the lance L. The nozzle 68 is also closely disposed to the surface of the filament deposition. The particulate matter is introduced into the feeding tube 67 through a receiver 69 located on the carriage 32 in the manner as illustrated in FIGS. 1 and 6. It can be understood that the receiver 69 communicates with the feeding tube 67 by internal ducture (not shown). Furthermore, as the entire carriage 32 is shifted to the position where the lance L is disposed in the mold 7, the receiver 69 is located at a discharge 70 formed on the hopper 25. Thus, as the receiver 69 is immediately disposed beneath the discahrge 70, it will actuate a trip switch (not shown) in order for the sand and/or other particulate matter in the hopper to be introduced through the receiver 69 into the feeding tube 67.

It is possible to add the sand to the resin-glass composition in various ways in order to achieve the desired result. For example, all of the sand could be added after the addition of the resin. Typically, it is desirable to add the sand either simultaneously with the resin or after the application of the swirl patterns. The sand being heavier than the resin will actually replace the resin and move toward the exterior surface of the structure being formed. In essence, the resin would be forced inwardly in order to produce a more resin rich inner layer on the interior surface of the tubular member T. In addition, the sand also packs the glass into the resin matrix.

Inasmuch as the sand would move toward the exterior surface of the structure, the sand, in essence, forms a protective layer thereby rendering the structure more resistant to abrasive action. The sand also provides a rather pleasant aesthetic appearance. It can be observed that inasmuch as the particulate matter is relatively inexpensive compared to the overall cost of the glass and resin matrix, substantial economies are achieved by adding the particulate matter without affecting the overall structural parameters of the tubular member T. In addition, as indicted previously, the sand enhances certain structural parameters of the tubular member T. Accordingly, the desired structural parameters would be taken into consideration along with the economic factors in order to determine the amount of particulate matter which is added to the structure.

By reference to FIG. 1, it can be seen that the creel supporting platform 33 is connectable to and removable with respect to the carriage 32. The carriage 32 is shiftable along the set of trackc 29 and each of a plurality of creel supporting platforms 33 could be shiftable along a set of tracks (not shown) which are perpendicularly located with respect to the tracks 29. Further, if it is desired to operatively attach a new creel supporting platform 33 to the carriage 32, the desired creel supporting platform 33 is shifted along the perpendicular tracks into alignment with the tracks 29. At this point, a conventional wheel shifting mechanism (not shown) is employed to raise one set of wheels under the creel supporting platform 33 and lower a second set of wheels under the platform 33 to shift the platform 33 along the tracks 29. This type of wheel shifting is well known in the art and is similar to the type used on mining freight cars. Thus, as one creel platform 33 is being used in the production of a tubular member T, one of the remaining standby creel supporting frames 33 can be readied for the next operation. Each of the creel supporting platforms 33 is provided with suitable aperture filament card (now shown) for properly threading each of the filament strands to pass into the lance L. A suitable prime mover (not shown) can be provided for shifting each of the creel supporting platforms 33.

Located along each of the longitudinal sides of the supporting structure 1 are a pair of pipe removal stations 75 and each of which is substantially identical in construction. Each of the pipe removal stations 75 generally comprises a support frame 76 having outriggers 77 which extend toward the lower mold supporting frame 3, in the manner as illustrated in FIGS. 1 and 3.

Figure 4:
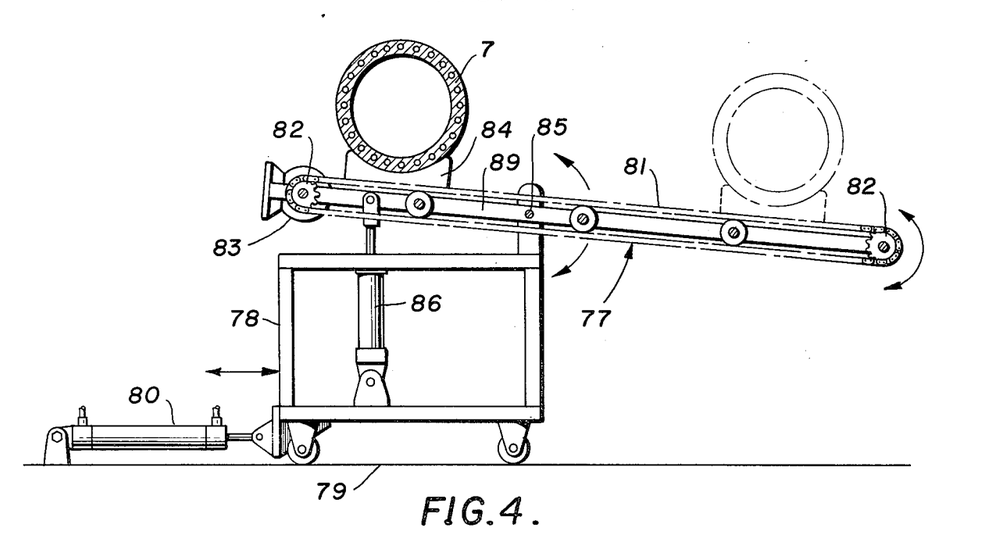
FIG. 4 is a fragmentary vertical sectional view taken along line 4—4 of FIG. 1 and showing a portion of a mold conveying mechanism.

The outriggers 77 are more fully illustrated in FIG. 4. It can be seen that each of the outriggers 77 comprises a shiftable base 78 which is movable transversely away from and toward the lower mold supporting frame 3 on a stationary base member 79. The base 78 is shifted along the stationary base member 79 by means of a hydraulic cylinder 80 which is actuated from the control panel as previously described. The outrigger 77 has disposed thereon a continuous moving belt 81 in the form of a conveyor belt, and the conveyor belt 81 is trained about a pair of rollers 82, which are mounted in tiltable frame 89, and one of the rollers 82 is driven by means of an electric motor 83. In addition, the belt 81 carries a mold support block 84 for carrying the mold 7 in the manner as illustrated in FIG. 6. In addition, the entire outrigger 77 can be pivoted about a pivot pin 85 through the action of another hydraulic cylinder 86, also in the manner as illustrated in FIG. 4. Thus, it can be seen that the base 78 of the outrigger 77 can be adjusted with respect to the mold supporting frame 3, and the location of the outrigger 77 can be adjusted with respect thereto.

The outriggers 77 would engage the mold 7 through the action of the belt 81 and shift the mold to the ejected position as illustrated in phantom lines in FIG. 4. The mold 7 can be withdrawn from the upper mold support frame 3 of the lower mold support frame 4 when the two frames 3, 4 are in a separated position, as illustrated in FIG. 2. As this occurs, it should be observed that the mold 7 will be supported by the lower drive rollers 15. The outrigger 77 is pivoted about the pivot pin 85 by a piston operable by the cylinder 86. Furthermore, the entire base 78 is shifted toward the mold support frame 4 so that the outrigger 77 extends under the mold 7 along with the mold receiving block 84. Thereafter, the mold is engaged by the block 84 and the entire block 78 is shifted away from the mold support frame 4. Thereafter, the outrigger 77 is pivoted downwardly about the pivot point 85 to the position as illustrated again in FIG. 4.

It can be seen that the mold 7 was shifted laterally while maintaining the same axial parallelism with respect to the mold supporting frame 3, 4. After the molds 7 are removed from the mold support frame 3, 4, they are thereupon located directly in front of and in alignment with pipe removal station 75.

By further reference to FIG. 1, it can be seen that the tubular structure thus produced is in the form of a pipe, though any other form of tubular member, T, such as a structural element, could be produced. The removal push rod mechanism 90 includes a support housing 91 containing a suitable prime mover (not shown) for reciprocatively shifting a push rod 92 in a longitudinal direction. The push rod mechanism 90 also contains matching counterarms (not shown) for engaging the rim of the mold 7 in a manner to restrain the mold 7 in position and against the force required to eject a length of tubular member T. Thus, upon actuation of the powered mechanism in the push rod mechanism 90, the push rod 92 will shift forwardly thereby engaging a completed length of tubular member T for urging the same out of the mold 9. This length of tubular member is ejected onto a cradle 93 supported on a conventional support frame 94 in the manner as illustrated in FIG. 1. The cradle 93 may contain a conveyor belt, if necessary, for shifting the ejected tubular member T to an optional post-curing station (not shown) or to an off-loading platform for transferral to storage.

By further reference to FIG. 1, it can be seen that two removal stations are provided for each centrifugal casting station. Thus, one mold 7 will always be located in the mold support frames 3, 4 for the making of a new tubular member while the other mold 7 is located at one of the two removal stations for ejection of the finally formed tubular member T.

OPERATION

At the beginning of each new production cycle in the making of reinforced plastic tubular member T, the mold 7 will always be preheated to a warm condition. Located on the forward end of the lance L is a spray head for laying down a film of mold release agent. Thus, after a mold 7 is introduced into the mold support frames 3, 4, the carriage 32 is actuated and shifted forwardly upon the tracks 29. The lance L projecting forwardly from the carriage 22 is inserted into the open end of the mold 7. As the lance is introduced into the mold 7, a film of release agent is applied to the entire mold surface. In this connection, it should be noted that the drive rollers 11 and 15 have been rotated in order to impart to the mold 7 a desired speed of rotation. It should also be noted that the residual heat in the mold 7 will act to flash-off the carrier solvent.

From the point of extreme penetration by the lance L into the mold 7, glass strands will be ejected from the feeding nozzles and applied to the interior surface of the rotating mold 7. Liquid resin is also simultaneously and lightly applied to the mold surface to initiate a wet-out condition as the strands are applied. The glass strands mold's metered at a rate substantially in excess of the molds surface velocity in order to apply to the mold the fiber glass or other reinforcing material in a swirl pattern. The lance L is also shifted reciprocatively in a longitudinal direction at a rate equal to one band width per revolution of the mold 7, for a distance equal to one incremental division in the mold's length. As the liquid resin is continually applied, sand or other particulate matter is also introduced into the resin-glass mixture.

It is also possible to fabricate the tubular member T by initially applying a layer of circumferential windings, or several layers of circumferential windings. In this case, the mold 7 is essentially rotated at a rate properly programmed to the feed-in deposition of the fiber glass or other filament strands so that the strands are laid side-by-side on the interior surface of the mold 7 in order to form a body of circumferential windings. Spiral helical type windings might also be applied, if desired. Thereafter, the filament strands are applied in the form of a swirl mat pattern to form a second layer. Thereafter, the strands may again be applied to the swirl mat pattern in order to achieve another circumferential pattern. In each case, it can be observed that these strands are resin impregnated and contain particulate matter throughout the entire composition.

Figure 12:
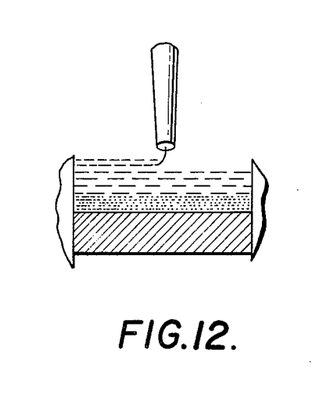
FIGS. 12 and 13 are schematic and elevational views, respectively showing the laying of a third layer of filamentary strands in the form of circumferential loops.
Figure 13:
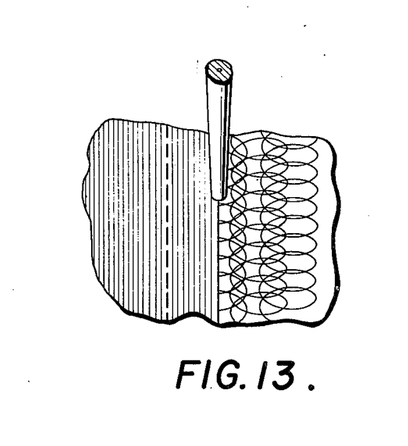

FIGS. 8–13 are a series of sequential views of both side elevational and top plan view sections showing strands applied to the mold interior surface in order to produce a particular tubular structure. In FIG. 8, a thin gel coat is applied to the interior surface of the mold. FIGS. 9 and 10 disclose the application of a first set or first two sets circumferential strands to the interior surface of the mold. This is followed by several layers of swirl mat fiber glass or other filament strand deposition as illustrated in FIGS. 11 and 12. Finally, the swirl mat layers can be followed by additional circumferentially applied strands much in the manner as illustrated in FIGS. 13 and 14. It should be observed that this is only one form of winding pattern geometry which can be used in the present invention, and that a wide variety of winding patterns and composition mixtures may be employed.

After all of the materials are applied to the interior surface of the mold 7, in the proper pre-selected amounts, the strands are severed by means of the guillotine type cutter with the several tag ends of the strands being blown through onto the interior surface of the mold 7.

In this connection, it should be recognized that it is possible to employ both a sugar-sand along with a coarse sand. The control system will initiate a time trade between the two grades of sands. The sugar type sand would be employed for the innermost layer of the tubular member T, when employed as an aggregate to be distributed throughout the wall section thickness. While it is intended to employ a single set of tubes for delivering and distributing catalyzed liquid binder resin and a single set of tubes for the sand; in many cases it may be necessary or desirable to add a second resin delivery system and/or a second sand delivery system. After all of the materials have been applied to the interior surface of the mold 7, the lance L is withdrawn therefrom by means of the carriage 32 shifting rearwardly with respect to the supporting structure 1. The rotational speed of the mold 7 is increased to provide additional centrifugal force needed to enhance packing of the materials and to remove any air entrained in the materials which have been centrifugally applied to the interior surface of the mold 7. The external heat may be increased in order to force an accelerated gellation or a complete cure.

At the point when the tubular member T is partially or completely cured, the mold rotation is stopped. The mold support frames 3, 4, which contain heating shrouds, are shifted in order to expose the mold 7. The outriggers 77 are shifted inwardly for engaging the mold 7 causing a shifting movement laterally into the pipe removal station.

It should be observed, in connection with the invention, that it is possible to generate any pattern geometry of strands which places those strands in a manner to satisfy all primary structural requirements. It should also be apparent that, by the centrifugal casting method, the sand aggregate mixture can be introduced and positioned at any rate and volume required to reach the optimum loading fraction in the final tubular member T.

Having thus described our invention, what we desire to claim and secure by Letters Patent is:

1. Apparatus for making a filament reinforced tubular member, apparatus comprising a die forming element having a shape similar to that of the reinforced tubular member to be produced, a lance member extendable into said die forming element, filament feeding means carried by said lance member for applying a continuous filament strand to said die forming element, first powered means enabling a relative rotation between said filament feeding means and said die forming element, second powered means enabling a relative reciprocation to exist between said filament feeding means and said die forming element, resin matrix feeding means operatively associated with said filament feeding means and being carried by said lance member for adding a resin matrix to the filament strands, particulate matter feeding means also carried by said lance member for adding an inert particulate matter to the filament strands, particulate matter retaining means operating associated with said apparatus for holding an amount of particulate matter, outlet means forming part of said retaining means for discharging a portion of the particulate matter from the retaining means, switch means operated associated with said outlet means and being located to be actuated by said lance member, so that upon actuation said outlet means will open and discharge a portion of the particulate matter for introduction into said particulate matter feeding means, and means for curing the composite structure.

2. The apparatus of claim 1 further characterized in that control means is operatively connected to said first powered means and filament feeding means for feeding the continuous filament strand in timed relation to said relative rotation.

3. The apparatus of claim 1 further characterized in that control means is operatively connected to said first powered means and said filament feeding means for feeding the continuous filament strand in timed relation to said relative rotation, said control means being adapted to maintain the relative rotation and the rate of feeding the continuous strand in such proportion that the filament strand is centrifugally applied to said die forming element and retained thereon.

4. The apparatus of claim 1 further characterized in that said filament feeding means comprises a carriage member shiftable in an axial direction with respect to said die forming element and said lance member is axially shiftable with respect to said carriage.

5. Apparatus for producing filament reinforced tubular members and the like having an annular side wall, said apparatus comprising a first work station, a die forming element at said first work station, strand application means for centrifugally applying filament strands to said die forming element to produce a configuration similar to a surface of said die forming element, means for applying a resin curable matrix to said filament strands to form a tubular member, means for curing said resin matrix while residing in said die forming element, a second work station, transfer means shiftable between said first work station and said second work station and being shiftable in a first direction laterally toward and away from said die forming element, conveyor means operating associated with said transfer means and being shiftable in a second direction substantially perpendicular to said first direction to engage and remove said die forming element from said first work station so that said transfer means can shift said die forming element to said second work station, ejection means at said second work station for ejecting said tubular member from said die forming element, a third work station, and ejection means at said third work station for also ejecting said tubular member from said die forming element, said second and third work stations alternately receiving said die forming element with a tubular member formed therein, and one of said second or third work stations being adapted to retain an empty die forming element for transference to said first work station when a die forming element with a tubular member formed therein is transferred to the other of said second or third work stations.

6. The apparatus of claim 5 further characterized in that the strand application means for centrifugally applying filament strands to the die forming element is a reciprocating feeding head.

7. The apparatus of claim 5 further characterized in that control means is operatively connected to said first powered means and strand application means for feeding filament strands in timed relation to said relative rotation so that said strands are centrifugally applied to and retained on said die forming element.

8. The apparatus of claim 7 further characterized in that said first direction is substantially perpendicular to the axis of said die forming element so that said transfer means moves in a horizontal direction and said second direction is a vertical direction so that said conveyor means can raise and lower said die forming element.

9. The apparatus of claim 5 further characterized in that said strand application means comprises a carriage axially shiftable with respect to said die forming element and a lance member which is shiftable with respect to said carriage in an axial direction toward and away from said die forming element.

10. The apparatus of claim 5 further characterized in that means is provided for adding an inert particulate matter to the resin matrix and filament strand composition and is secured in the composite structure when cured.

11. Apparatus for making a filament reinforced tubular structure comprising:
   a. a substantially cylindrical die forming element having an interior major surface similar to that of the reinforced structure to be produced,
   b. a strand feeding member extendable into said die forming element substantially along the axis of said die forming element and carrying continuous filament containing strands into said die forming element,
   c. said strand feeding member having a plurality of strand feeding heads associated therewith for receiving portions of the filament containing strands carried by said strand feeding member, and said feeding heads being located in spaced apart relationship along the length of said strand feeding member and extending toward said interior major surface for issuing the continuous filament containing strands to said receiving surface,
   d. first powered means operatively associated with said die forming element to rotate said die forming element relative to said strand feeding member and at a rate sufficient to centrifugally retain the filament strands on said interior major surface,
   e. second powered means operatively associated with said die forming element and said feeding member to generate a relative reciprocation between said die forming element and said strand feeding member so that each of said strand feeding heads traverse only a portion of the axial length of said die forming element thereby permitting the strands issuing therefrom to be applied to said surface only for the portion of the length traversed by said strand feeding heads,
   f. said strand feeding member being moved sufficiently so that the area covered by one of said heads is at least abutting to the area covered by the next adjacent head,
   g. the number of feeding heads on said strand feeding member being sufficient so that at least the greater portion of said interior major surface is covered by said strands,
   h. matrix material feeding means operatively associated with said strand feeding member for adding a matrix curable material to said filament containing strands,
   i. particulate matter feeding means operatively associated with said strand feeding means for adding a particulate matter to the filament containing strands and resin matrix,
   j. and means for curing the matrix curable material in the filament containing strand composite with the particulate matter incorporated therein to form a hardened filament reinforced tubular structure.

12. The apparatus for making a tubular filament reinforced structure of claim 11 further characterized in that the particulate matter feeding means is adapted to add sand as the particulate matter.

13. The apparatus for making a tubular filament reinforced structure of claim 11 further characterized in that feeding control means is operatively associated with said strand feeding member for feeding said strands to said die forming element at a rate so that a first layer of circumferential strands are centrifugally applied to and retained on said interior major surface, said feeding control means also controlling the application of strands from said strand feeding member to apply a second layer of randomly located spiral strands to said first layer.

14. The apparatus for making a tubular filament reinforced structure of claim 11 further characterized in that the strand feeding member and the means for feeding the resin matrix and the means for adding the particulate matter are carried by a lance which is reciprocated within said die forming element.

15. Apparatus for making a filament reinforced tubular structure comprising:
   a. a die forming element having an interior major surface similar to that of the reinforced structure to be produced,
   b. carriage means shiftable in an axial direction with respect to said die forming element toward and away from one end of said die forming element,
   c. a lance member carried by said carriage means and being reciprocatably shiftable with respect to said carriage means for insertion into said die forming element through said one end thereof and being axially reciprocatable therein,
   d. means for rotating said die forming element relative to said lance,
   e. strand feeding means carried by said lance and being reciprocatably shiftable therewith and with respect to said die forming element to apply filament containing strands to said interior major surface and which strands are centrifugally retained thereon,
   f. feed control means also carried by said carriage means for feeding the strands in timed relation to the rate of rotation of the die forming element so that the strands are issued from the feeding means and centrifugally applied to and retained on the interior major surface.
   g. means carried by said lance member for adding a curable matrix material to said strands,
   h. means carried by said lance member for adding a particulate matter to the strands and curable matrix material,
   i. and means for curing the composite of the matrix material and strands with the particulate matter incorporated therein to form a filament reinforced tubular structure.

16. The apparatus for making a tubular filament reinforced structure of claim 15 further characterized in that the means carried by said lance member for adding a particulate matter is adapted to add sand as the particulate matter.

17. The apparatus for producing filament reinforced tubular members and the like having an annular side wall, said apparatus comprising a first work station, a die forming element, a die forming receiving member at said first work station to removably hold said die forming element, strand application means for centrifugally applying filament strands to a surface of said die forming element, means for applying a resin curable matrix to said filament strands to form a tubular member, means for curing said resin matrix while residing in said die forming element, a second work station, a frame member at said second work station, an outrigger carried by said frame member and being extendable toward and away from said first work station, means operatively associated with said outrigger for shifting said outrigger in a vertical path to engage said die forming element at said first work station and lift same from said die forming receiving member and for shifting said die forming element to said second work station, and means at said second work station for ejecting said tubular member from said die forming element.

18. The apparatus of claim 17 further characterized in that the die forming element has a shape similar to that of the reinforced tubular member to be produced, and the apparatus also comprises first powered means enabling a relative rotation between said strand application means and said die forming element, and second powered means enabling a relative reciprocation to exist between said strand application means and said die forming element.

19. The apparatus of claim 17 further characterized in that said filament feeding means comprises a carriage member shiftable in an axial direction with respect to said die forming element and a lance member which is shiftable axially with respect to said carriage member.

20. The apparatus of claim 17 further characterized in that means is carried by said outrigger which has a size and shaped portion conforming to the exterior surface of said die forming element to engage and hold said die forming element.

21. The apparatus of claim 17 further characterized in that the apparatus also comprises a third work station, a frame and outrigger at said third work station and which outrigger is extendable toward said first work station for engaging said die forming element and shifting said die forming element to said third work station, means also operatively associated with said outrigger at said third work station for shifting the outrigger in a vertical path to engage the die forming element at the first work station, lift the same from said die forming receiving member and shift the die forming element to the third work station, and means at said third work station for ejecting the tubular member thus formed from said die forming element.

22. Apparatus for making a filament reinforced tubular structure comprising:
   a. a die forming element having an interior major surface similar to that of the reinforced structure to be produced,
   b. carriage means shiftable toward and away from one end of said die forming element,
   c. a lance member carried by said carriage means and being reciprocatably shiftable with respect to said carriage means, said lance member being located on said carriage means for insertion into said die forming element through said one end thereof and being reciprocatable therein,
   d. means for rotating said die forming element relative to said lance,
   e. strand feeding means carried by said lance and being reciprocatably shiftable therewith and with respect to said die forming element to apply filament containing strands to said interior major surface and which strands are centrifugally retained thereon,
   f. feeding control means operatively associated with said strand feeding member for feeding said strands in timed relationship to the rate of rotation of said die forming element so that said strands are centrifugally applied to and retained on said interior major surface,
   g. said feeding control means comprising:
      1. inlet means for accommodating a plurality of individual filament containing strands,
      2. metering means for providing a proper amount of the strands in response to demand therefor,
      3. means forming a plurality of ducts leading to said feeding means,
      4. and means for creating a venturi effect in said ducts to urge said strands through said ducts and into said feeding means,
   h. means carried by said lance member for adding a curable matrix material to said strands,
   i. means carried by said lance member for adding a particulate matter to the strands and curable matrix material,
   j. and means for curing the composite of the matrix material and strands with the particulate matter incorporated therein to form a filament reinforced tubular structure.

* * * * *